UNITED STATES PATENT OFFICE.

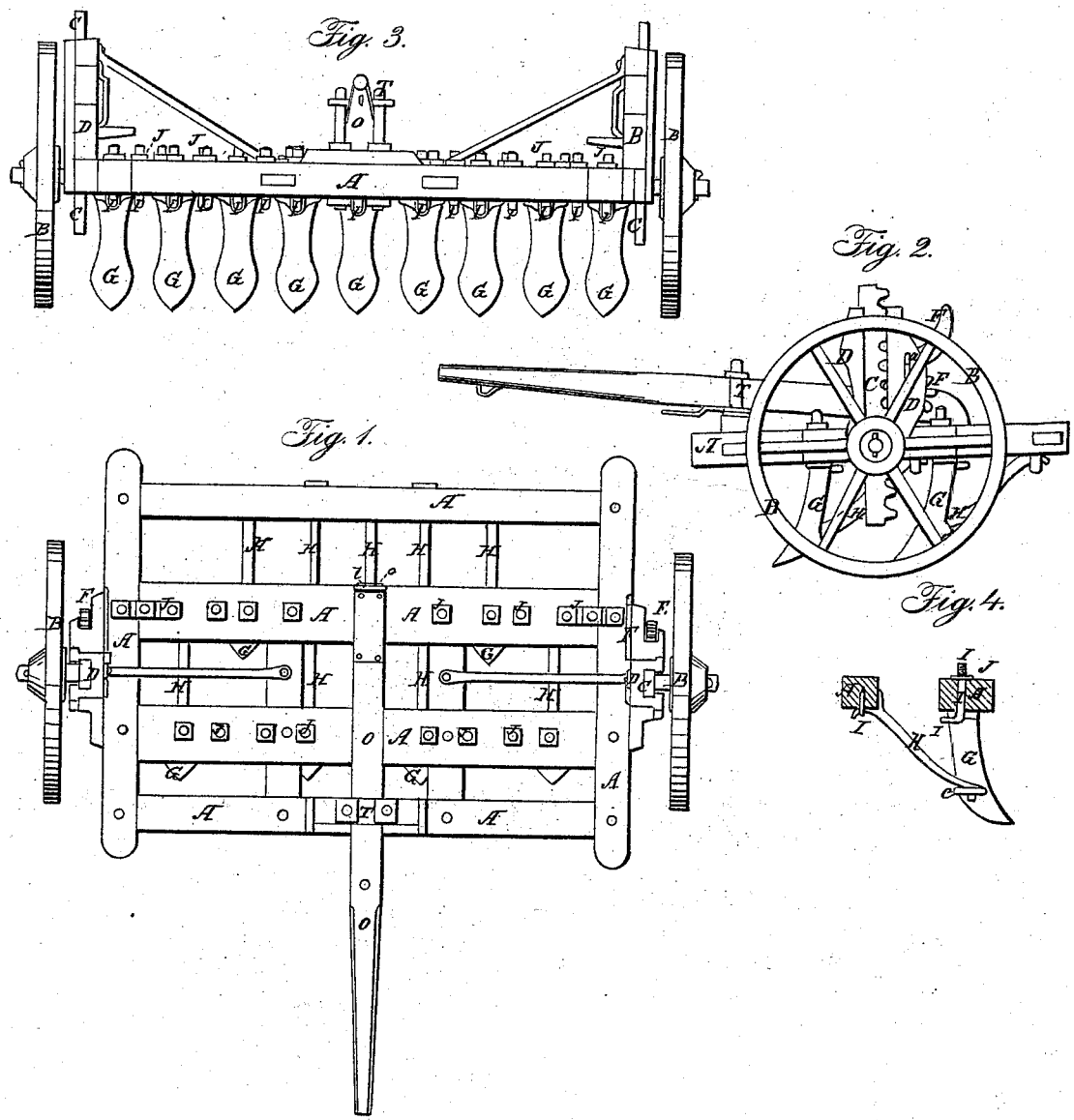

JAMES P. TOSTEVIN, OF RACINE, WISCONSIN.

IMPROVEMENT IN CULTIVATORS.

Specification forming part of Letters Patent No. 39,597, dated August 18, 1863.

*To all whom it may concern:*

Be it known that I, JAMES P. TOSTEVIN, of Racine, Racine county, in the State of Wisconsin, have invented certain new and useful Improvements in Cultivators; and I do hereby declare that the following is a full and exact description thereof, reference being had to the accompanying drawings, and to the letters of reference marked thereon.

In the drawings, Figure 1 is a plan view. Fig. 2 is a side elevation. Fig. 3 is a front elevation. Fig. 4 is a sectional view, showing manner of fastening a tooth to the frame.

To enable those skilled in the art to make and use my invention, I will proceed to describe its construction and operation.

The nature of my invention consists in the improved mode of attaching the teeth to the frame, in the mode of regulating the depth of cut, and in the manner of attaching the draft-pole to the frame.

In the drawings similar characters refer to like parts.

A is the frame-work; B B, the wheels, the axles of which are attached firmly to the racks C.

D are metallic standards securely braced to the sides of the frame, and are provided with vertical grooves, in which the racks C move up and down.

E are small pinions, having their bearings in the standards D and gearing into the racks C.

F are dogs pivoted to standards D, and are provided with a stud or tooth, $a$, which catches between the teeth of the pinions, so as to secure them in any desired position.

By this device I am enabled to cut with the teeth to any desired depth. As the wheels are raised up the racks rise up, turning the pinions. The dogs are then made to take into them, thus preventing their turning, and consequently holding the racks and the wheels in the desired position. When the wheels are raised higher the teeth extend lower down and cut deeper.

G are the cultivator-teeth, of a form substantially as shown in the drawings. The rear and concave side of these teeth is provided with a lug, $c$, having a hole in it for the reception of the brace H. The upper end of the tooth, where it touches the frame, is flared out and has a plain surface, so as to fit squarely and firmly against the frame. It is also provided with a hole for the reception of the hook I, which clamps the tooth tightly to the frame by means of the nut J on the upper end of the hook and on top of the frame. These hooks I are ranged along on the frame at suitable distances, so as to hold the teeth in the various arrangements that may be desired in cultivating the soil for different purposes.

H are the braces which support and steady the teeth against the resistance of the soil. One end of these braces fits into the hole in the lug $c$ of the teeth, while the other end, which is forked, embraces and presses against the corner of the rear beams, 1 1, of the frame. One prong of the fork is slightly hooked and is passed under the staples L. (See Fig. 4.)

It will be readily seen that when it is wished to remove or change a tooth I have only to unscrew the nut J and drive out the hook I, when I can remove the tooth by hand, slipping it off the end of the brace. By a reversal of this process I can replace the tooth or secure it to another hook, according to the desired arrangement.

O represents the draft-pole. The rear end of this pole is provided with a hook, $o$, which catches in a staple, $t$, on one of the rear beams of the frame. The pole is also secured to the front beam of the frame by the screw-bolts and plates T.

Having thus fully described the construction and operation of my invention, what I claim as new, and desire to secure by Letters Patent, is—

The combination and arrangement of braces H, hooks I, nuts J, and staples L, operating substantially in the manner and for the purposes set forth.

JAMES P. TOSTEVIN.

Witnesses:
WM. K. MAY,
C. W. BENNETT.